(12) United States Patent
Boggess et al.

(10) Patent No.: US 7,648,184 B2
(45) Date of Patent: Jan. 19, 2010

(54) AUDIO COMPONENT MOUNTING SYSTEM

(75) Inventors: Brian Boggess, Dublin, OH (US); Matthew Seman, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 663 days.

(21) Appl. No.: 11/277,598

(22) Filed: Mar. 27, 2006

(65) Prior Publication Data
US 2007/0223137 A1  Sep. 27, 2007

(51) Int. Cl.
B60R 11/02 (2006.01)
B60R 21/045 (2006.01)

(52) U.S. Cl. .................. 296/1.03; 280/752; 296/187.05

(58) Field of Classification Search ................ 248/27.1; 280/748, 752; 296/1.03, 187.03, 187.05; 381/86
See application file for complete search history.

(56) References Cited

U.S. PATENT DOCUMENTS

| | | | | |
|---|---|---|---|---|
| 3,087,118 | A | * | 4/1963 | Goffstein .................... 455/345 |
| 4,460,147 | A | * | 7/1984 | Macbain .................... 248/542 |
| 4,462,564 | A | * | 7/1984 | Alves et al. ................ 248/27.1 |
| 4,709,943 | A | * | 12/1987 | Yoshimura et al. .......... 280/751 |
| 4,812,932 | A | | 3/1989 | Hishinuma et al. |
| 4,895,326 | A | * | 1/1990 | Nimpoeno et al. ......... 248/27.1 |
| 4,913,382 | A | * | 4/1990 | VanAcker .................. 248/27.1 |
| 4,930,696 | A | * | 6/1990 | VanAcker .................. 224/547 |
| 5,595,430 | A | | 1/1997 | Weyeneth |
| 5,676,338 | A | | 10/1997 | Warda et al. |
| 5,735,543 | A | | 4/1998 | Koppenstein et al. |
| 5,803,412 | A | * | 9/1998 | Storath et al. .............. 248/27.1 |
| 6,696,769 | B2 | | 2/2004 | Lee et al. |
| 2005/0001105 | A1 | * | 1/2005 | Matsuda et al. ............ 248/27.1 |
| 2008/0049949 | A1 | * | 2/2008 | Snider et al. ................. 381/86 |

FOREIGN PATENT DOCUMENTS

| | | | |
|---|---|---|---|
| DE | 19528868 | | 8/1996 |
| JP | 02258430 | A * | 10/1990 |
| JP | 6312638 | | 11/1994 |
| JP | 8183413 | | 7/1996 |
| JP | 9048292 | | 2/1997 |
| JP | 9109786 | | 4/1997 |
| JP | 9191186 | | 7/1997 |
| JP | 11059302 | | 3/1999 |
| JP | 2000190790 | | 7/2000 |
| JP | 2001146120 | | 5/2001 |
| JP | 2002211326 | | 7/2002 |
| JP | 2003104130 | | 4/2003 |
| JP | 2004130825 | | 4/2004 |
| JP | 2005132251 | | 5/2005 |

* cited by examiner

Primary Examiner—Glenn Dayoan
Assistant Examiner—Paul A Chenevert
(74) Attorney, Agent, or Firm—Plumsea Law Group, LLC; Mark E. Duell

(57) ABSTRACT

A mounting system for motor vehicle audio components is described. The mounting system comprises a chassis and at least one vibration damping element. The vibration damping element is mounted within the chassis in a position to support and secure an audio component. The vibration damping element has a slot receiving a fastener that is connected to the audio component. The fastener secures the audio component in a first position and translates along the fastener slot under a predefined load.

23 Claims, 10 Drawing Sheets

AUDIO COMPONENT MOUNTING SYSTEM

BACKGROUND OF THE INVENTION

1. Field of the Invention

The present invention relates generally to motor vehicles, and in particular to an audio component mounting system for motor vehicles.

2. Description of Related Art

Many different types of audio systems and audio components may be installed in a motor vehicle. A basic audio system may be as simple as an AM/FM radio and a loudspeaker. More sophisticated systems often include the ability to play many different types of media, including tape cassettes, compact disks (CDs), and, in some cases, digital versatile disks (DVDs). Typically, at least some audio components or portions of the audio system are installed in a pre-formed opening in a front instrument panel, so as to be accessible from the driver's and passenger's seats.

In a motor vehicle collision, each component within the motor vehicle is subjected to mechanical loads. Therefore, in most motor vehicles, the effect of mechanical loading on the vehicle components is taken into account in the vehicle design, so that the overall performance of the motor vehicle in a collision can be predicted.

Generally, a simple motor vehicle audio system does not greatly affect the overall performance of a motor vehicle in a collision because simple audio components, such as AM/FM radios, are so relatively light and flexible. However, as audio systems have increased in complexity, audio components have become more massive and stiffer. These more complex audio components may respond differently to impact than their less complex counterparts.

In general, it has been found that more complex, and thus, more massive audio systems impose increased load and force on occupants during collisions. Because of the large mass of these complex systems, the system can no longer be globally translated and still meet crash requirements for load or force transfer. A system is needed that helps more complex and more massive audio systems reduce the amount of force they impose on occupants during collisions.

SUMMARY OF THE INVENTION

In one aspect, the invention provides a mounting system. The mounting system comprises a chassis and at least one vibration damping element. The vibration damping element is mounted within the chassis in a position to support and secure an audio component. The vibration damping element has a slot that receives a fastener that is connected to the audio component. The fastener secures the audio component in a first position and translates along the slot, allowing the audio component to translate within the chassis under a predefined load.

In another aspect, the predefined load comprises an impact.
In another aspect, the slot is a closed slot.
In another aspect, the slot is an open slot.
In another aspect, the slot is a keyhole slot.
In another aspect, each of the vibration damping elements further comprises a raised land portion and at least one foot portion connected to the raised land portion and secured to the chassis. The slot extends through at least a part of the land portion.
In another aspect, the vibration damping elements each comprise a generally trapezoidal cross-sectional shape.
In another aspect, the invention provides a mounting system. The mounting system comprises an audio component, a chassis, at least one vibration damping element, and at least one locating tab. The chassis is adapted to be mounted in a pre-formed opening in an instrument panel. The vibration damping element is disposed between the chassis and the audio component. The vibration damping element has at least one fastener slot configured to receive at least one fastener associating the audio component with the vibration damping element. The locating tab is connected to the audio component and disposed between the audio component and the chassis in an installed position. The fastener slot allows the audio component to translate within the chassis under a predefined load.

In another aspect, the predefined load comprises an impact.
In another aspect, the fastener slots are open slots.
In another aspect, the vibration damping element further comprises a raised land portion and at least one foot portion connected to the raised land portion and secured to the chassis. The fastener slot extends through at least a part of the land portion.
In another aspect, the locating tab resiliently biases the audio component toward the installed position.
In another aspect, at least one mounting bracket is connected to the audio component between the audio component and the vibration damping element such that a fastener inserted through the fastener slot passes through a corresponding hole in one the mounting bracket.
In another aspect, the mounting bracket comprises additional locating features.
In another aspect, the invention provides a method for absorbing impact in an audio component of a motor vehicle, comprising the steps of: mounting the audio component into at least one vibration damper; mounting the vibration damper onto a chassis; installing the chassis into a pre-formed opening in an instrument panel of the motor vehicle; translating the audio component with respect to the vibration damper in response to a predetermined impact load.

In another aspect, the predefined load comprises an impact.
In another aspect, a slot on the vibration damper facilitates translation of the audio component with respect to the vibration damper.
In another aspect, a fastener associated with the audio component is configured to slide within the slot of the vibration damper during translation of the audio component.
In another aspect, a fastener associated with the audio component is configured to slide within the slot of the vibration damper during translation of the audio component.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
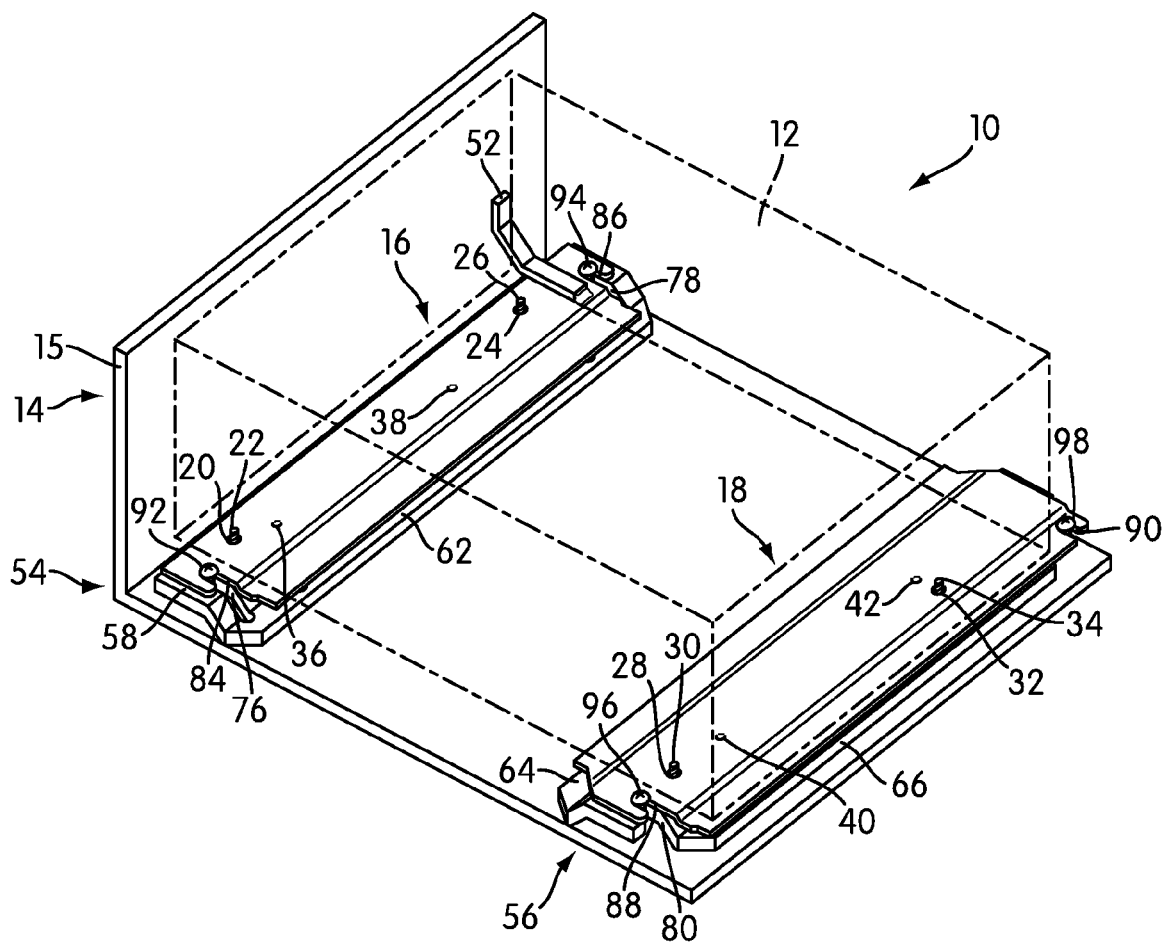
FIG. 1 is a perspective view of a preferred embodiment of a mounting system according to one embodiment of the invention.
Figure 2:
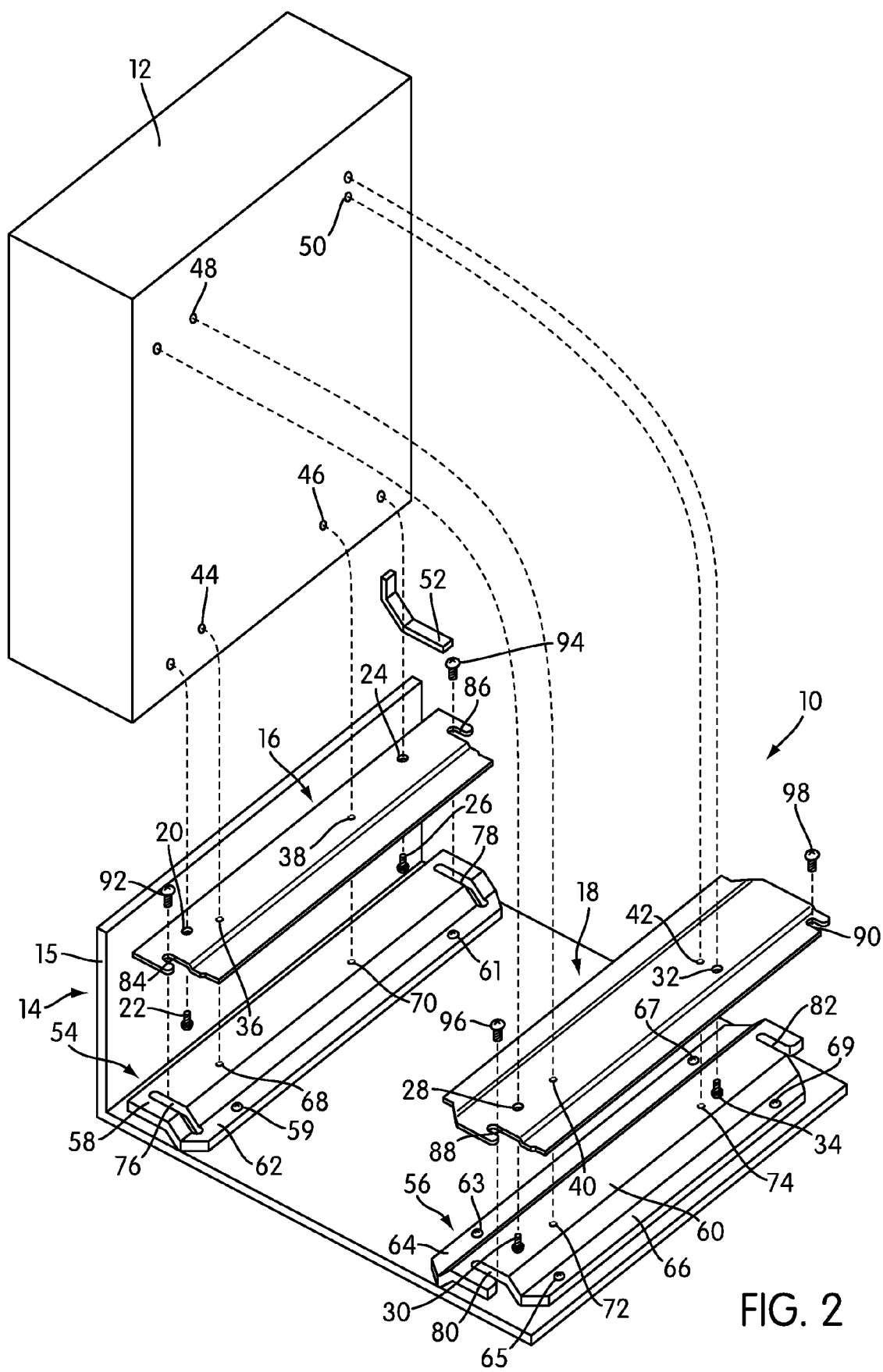
FIG. 2 is an exploded perspective view of the mounting system of FIG. 1.

FIG. 1 is a perspective view of a mounting system, generally indicated at 10, according to one embodiment of the invention. Mounting system 10 is particularly adapted to mount an audio component 12, which is shown in phantom in FIG. 1. The interconnection of the components in FIG. 1 is also illustrated in FIG. 2, an exploded perspective view of mounting system 10. As will be described in greater detail below, in one embodiment, mounting system 10 and mounted audio component 12 are preferably installed in a motor vehicle, particularly in a pre-formed opening in a motor vehicle instrument panel.

As used in this description, the term "audio component" refers to any audio component that may be installed in a motor vehicle, including AM, FM, and satellite radio receivers, CD players, multi-CD changers, digital audio players, and cassette tape decks. Additionally, any other piece of equipment that is capable of being installed in an instrument panel along with or alongside audio equipment may also be considered to be an audio component or audio components for purposes of this description. For example, DVD players, satellite navigation systems, and display monitors, among others, may be considered to be audio components for purposes of this description. In general, as will be explained in more detail below, the audio component mounting system of the present invention may be applied to any component that is designed to translate with respect to the instrument panel under a pre-defined load.

Mounting system 10 comprises, among other elements, a chassis 14. Chassis 14 is preferably made of a material such as metal, although it may be made of other materials, such as plastics. Chassis 14 is adapted to mount and retain the audio component 12. Although illustrated as having a particular structure in FIG. 1, chassis 14 may comprise any structure or set of elements that allows audio component 12 to be mounted using mounting system 10.

The sizes and relative sizes of chassis 14 and audio component 12 may vary from one embodiment to another. Generally, chassis 14 is of a standard size, and audio component 12 may have any size that fits within chassis 14. In one example, one common sizing standard for audio components is the DIN (Deutsche Industrie Norm) sizing standard, which dictates visible dimensions for each audio component of 50 mm in height by 180 mm in width. Audio components are also commonly made to a "double DIN" standard, which is conventionally taken to mean 100 mm in height by 180 mm in width. Alternatively, the sizes of chassis 14 and audio component 12 may not follow any particular standard.

In order to mount audio component 12 to chassis 14, mounting brackets 16, 18 are fixedly mounted to the underside of audio component 12. Depending on the embodiment, mounting brackets 16, 18 may be fixedly mounted by welding, securing with adhesives, securing with permanent fasteners, or by some other means. Although two mounting brackets 16, 18 are shown in the view of FIG. 1, other embodiments may use any number of mounting brackets, and those mounting brackets may have any size or other characteristics useful in mounting audio component 12. Alternatively, instead of mounting brackets 16, 18 fixedly mounted to audio component 12, appropriate mounting structure could be integrally formed with the body of the audio component.

Figure 3:
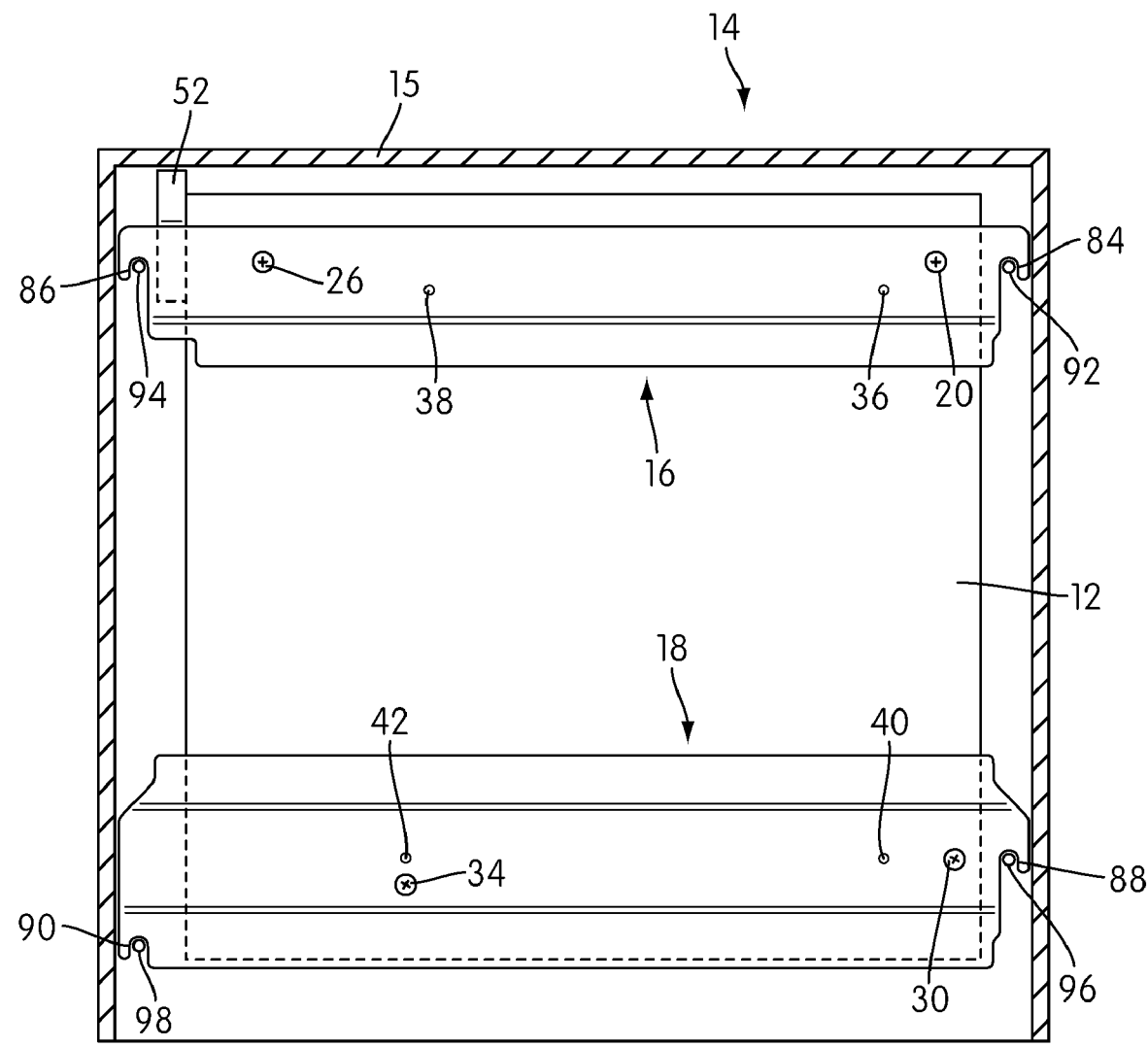
FIG. 3 is a plan view of the underside of a preferred embodiment of an audio component adapted for use with the mounting system.

The construction of mounting brackets 16, 18 can be seen in FIGS. 1 and 2, and also in FIG. 3, which is a plan view of the underside of audio component 12. In the illustrated embodiment, the first mounting bracket 16 has a first fastener hole 20 associated with a first fastener 22 that engages audio component 12 and a second fastener hole 24 associated with a second fastener 26 that engages audio component 12. The second mounting bracket 18 also has two fastener holes 28, 32 associated with respective fasteners 30, 34 that engage the audio component 12. Thus, by the action of fasteners 22, 26, 30, 34, mounting brackets 16, 18 are secured to audio component 12.

In addition to fastener holes 20, 24, 28, 32, each mounting bracket 16, 18 in the illustrated embodiment includes at least one locating feature. Specifically, first mounting bracket 16 includes two locating features 36, 38 and second mounting brackets 18 includes two locating features 40, 42. In the illustrated embodiment, the locating features 36, 38, 40, 42 are substantially hemispherical domes pressed or punched into mounting brackets 16, 18 that correspond with hemispherical depressions 44, 46, 48, 50 in the underside of audio component 12. Hemispherical depressions 44, 46, 48, 50 are best seen in the exploded view of FIG. 2. Locating features 36, 38, 40, 42 assist in the positioning of mounting brackets 16, 18 on audio component 12 at the time of fixing audio component 12 to mounting brackets 16, 18. In other embodiments, locating features 36, 38, 40, 42 may be notches, slots, or any other feature that aids in the positioning of mounting brackets 16, 18 and audio component 12. Alternatively, locating features 36, 38, 40, 42 may be absent. Also connected to or integral with mounting bracket 16 is a locating tab 52 that will be described below in more detail.

As shown in FIGS. 1 and 2, mounting brackets 16, 18 of audio component 12 are mounted to chassis 14 through vibration damping elements 54, 56. Each vibration damping element 54, 56 is a rail-like structure that extends transversely across the width of audio component 12, generally parallel to the corresponding mounting bracket 16, 18. Each vibration damping element 54, 56 includes a raised land portion 58, 60 and one or two flange-like foot portions 62, 64, 66. In this aspect, first vibration damping element 54 differs from second vibration damping element 56: first vibration damping element 54 has only one foot portion 62, whereas front vibration damping element 56 has two foot portions 64, 66, one arranged on each side of land portion 60. Foot portions 62, 64, 66 are connected to chassis 14 proximate to the transverse ends of vibration damping elements 54, 56. However, in other embodiments, the first and second vibration damping elements 54, 56 may be identical. Each vibration damping element 54, 56 may also include additional locating features 68, 70, 72, 74 to assist in alignment with the corresponding mounting bracket 16, 18.

At appropriate positions on the raised land portions 58, 60, fastener slots 76, 78, 80, 82 are formed that correspond in position with fastener openings 84, 86, 88, 90 in mounting brackets 16, 18. As shown in FIG. 2, fasteners 92, 94, 96, 98 are inserted between land portions 58, 60 of vibration damping elements 54, 56 and mounting brackets 16, 18, through fastener slots 76, 78, 80, 82 and fastener openings 84, 86, 88, 90, in order to secure those components together. The fasteners 92, 94, 96, 98 may be bolts, screws, rivets or other types of fasteners. Additionally, vibration damping elements 54, 56 are provided with holes 71, 73, 75, 77, 79, 80 in their respective foot portions 62, 64, 66 that are adapted to engage fasteners 59, 61, 63, 65, 67, 69 to connect vibration damping elements 54, 56 to chassis 14. In the illustrated embodiment, two fasteners 59, 61, 63, 65, 67, 69 are provided in each foot portion 62, 64, 66, although any number of fasteners 59, 61, 63, 65, 67, 69 and any fastener pattern may be used.

Figure 4:
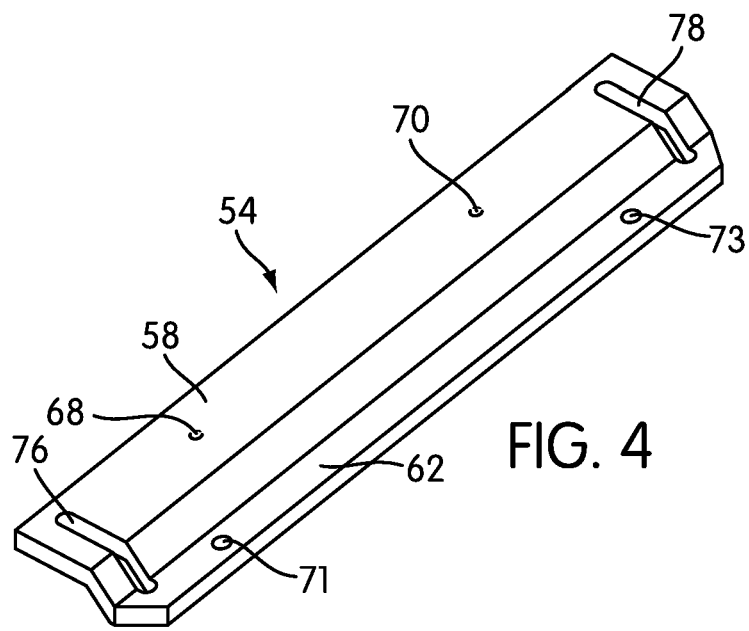
FIG. 4 is a perspective view of a preferred embodiment of a first vibration damping element with a closed fastener slot.

FIG. 4 is a perspective view of first vibration damping element 54 in isolation, illustrating its fastener slots 76, 78. As shown in FIG. 4, fasteners slots 76, 78 preferably extend over at least a part of land portion 58 and, in the illustrated embodiment, also extend into foot portion 62. However, in other embodiments, fastener slots 76, 78 may be confined to land portion 58. Fastener slots 76, 78 are preferably oriented at least generally perpendicular to the length of first vibration damping element 54, so that they extend in a generally front-to-rear direction when vibration damping elements 54 are installed in chassis 14. However, in other embodiments, fastener slots 76, 78 may be oriented in other directions. Fastener slots 76, 78 of first vibration damping element 54 are preferably closed at both ends, although they may be open at one or both ends in other embodiments.

Figure 5:
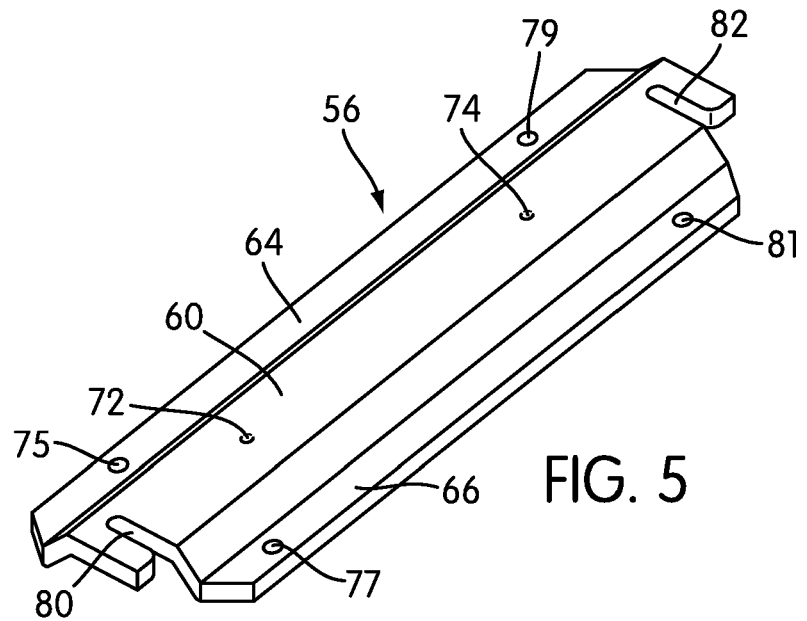
FIG. 5 is a perspective view of a preferred embodiment of a second vibration damping element with an open fastener slot.

FIG. 5 is a perspective view of second vibration damping element 56 in isolation. As was described above, second vibration damping element 56 has two foot portions 64, 66, one adjacent to each side of its central raised land portion 60. Second vibration damping element 56 also includes two fastener slots 80, 82, but unlike first vibration damping element 54, fastener slots 80, 82 of second vibration damping element 56 are open slots. That is, as shown in FIG. 5, fastener slots 80, 82 are generally elongate with one end closed and one end open. Fastener slots 80, 82 are preferably oriented at least generally perpendicular to the length of the vibration damping element 56, so that they extend in a generally front-to-rear direction when second vibration damping element 56 is installed in chassis 14. However, in other embodiments, fastener slots 80, 82 may be oriented in other directions.

Thus, with the above-described arrangement, audio component 12 is secured to mounting brackets 16, 18, which are mounted on respective first and second vibration damping elements 54, 56. Vibration damping elements 54, 56 are mounted to chassis 14. As will be described in more detail below, chassis 14 itself may be mounted within a motor vehicle.

As shown particularly in FIGS. 4 and 5, as viewed from the side or in section, vibration damping elements 54, 56 have a generally trapezoidal shape or, in the case of first vibration damping element 54, a partially trapezoidal shape, and they are preferably constructed of a somewhat resilient material, rather than a completely rigid one. Therefore, if chassis 14 is exposed to vibrations, as might occur if a motor vehicle travels over a bumpy road, the resiliency of vibration damping elements 54, 56 helps to damp the vibrations and prevent them from reaching audio component 12.

Under most conditions, audio component 12 remains substantially fixed within chassis 14 because of the fastening arrangement described above. However, one advantage of mounting system 10 and other mounting systems according to embodiments of the invention is that under a predefined load, audio component 12 may be permitted to translate or slide within chassis 14. Using mounting system 10, it is possible for audio component 12 to translate or slide because vibration damping elements 54, 56 are provided with fastener slots 76, 78, 80, 82, rather than fastener holes. As can be seen in FIG. 1, audio component 12 is preferably smaller than chassis 14 in at least one dimension, leaving room for audio component 12 and the attached mounting brackets 16, 18 to slide.

The predefined load at which audio component 12 translates or slides within chassis 14 may be any level of mechanical loading. However, in preferred embodiments, the predefined load for translating or sliding is defined to be a particular level of impact or collision force exerted on audio components 12. For example, if a passenger's head were to impact audio component 12 mounted using mounting system 10 with a particular predefined load, audio component 12 would translate rearwardly in order to absorb the impact and dissipate the force. Thus, mounting system 10 is particularly advantageous for use with audio components that are more massive and stiffer and thus require special measures to meet crash impact standards. For example, mounting system 10 may be used to meet the FMVSS 201 standards in the United States ("Federal Motor Vehicle Standard 201: Occupant protection in interior impact," 37 C.F.R. § 571.201 (2004).)

It should be understood that although the terms "translate" and "slide" are used with respect to the response of mounting system 10 and audio component 12 to the predefined load, the response of mounting system 10 and audio component 12 to the predefined load may include any sort of motion, deformation, or other mechanical response that acts to dampen or dissipate the predefined load. Mounting system 10 facilitates motion and/or deformation in response to a predefined load; however, the actual response to the predefined load will depend on the magnitude of the load and the manner in which it is applied.

One other component of mounting system 10 may help to absorb impact forces. As shown in FIGS. 1 and 2 and described briefly above, locating tab 52 is connected to or integrally formed with first mounting bracket 16 of audio component 12 so as to be disposed between audio component 12 and rear wall 15 of chassis 14. During installation and mounting of audio component 12 is chassis 14, locating tab 52 helps to ensure proper placement of audio component 12. Locating tab 52 is resilient, such that if and when audio component 12 translates rearwardly, locating tab 52 will absorb at least some of the impact force. However, although described as resilient, it should be understood that the degree of resilience in locating tab 52 may vary from embodiment to embodiment. In some embodiments, locating tab 52 may keep audio component 12 in place under normal conditions and simply deform to absorb energy under the defined conditions.

Using fastener slots 76, 78, 80, 82, the amount of impact or collision force that constitutes the predefined load for translating or sliding may be determined by specifying the amount of torque applied to fasteners 92, 94, 96, 98 that secure the mounting brackets 16, 18 to the vibration damping elements 54, 56. As those of ordinary skill in the art will understand, fasteners 92, 94, 96, 98 are prevented from sliding within fastener slots 76, 78, 80, 82 by frictional forces. The amount or level of frictional force is determined by the amount of torque applied to fasteners 92, 94, 96, 98 and the coefficients of friction between fasteners 92, 94, 96, 98 and fasteners slots 76, 78, 80, 82. If desired, vibration damping elements 54, 56 may be engineered to have particular coefficients of friction for more precise control over the defined condition force levels.

Figure 6:
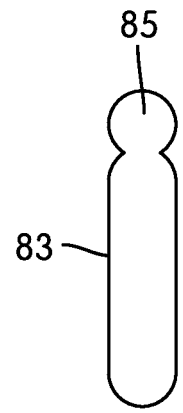
FIG. 6 is a schematic view of a preferred embodiment of a keyhole fastener slot that may be used in embodiments of the invention.

Fasteners slots 76, 78, 80, 82 used with mounting system 10 need not be the simple elongate closed and open slots illustrated in FIGS. 4 and 5. Instead, a number of slot configurations could be used with mounting system 10, each configuration having its own advantages. For example, FIG. 6 illustrates a keyhole slot 83. With keyhole slot 83, a fastener is initially constrained within a small portion 85 of the overall length of slot 83. However, a predefined load deforms and effectively lengthens slot 83, allowing the fastener that was previously confined to small portion 85 to translate over the entire length of slot 83.

The foregoing described the application of mounting system 10 to a single audio component 12. However, mounting systems according to embodiments of the invention may also be applied to multiple audio components.

Figure 7:
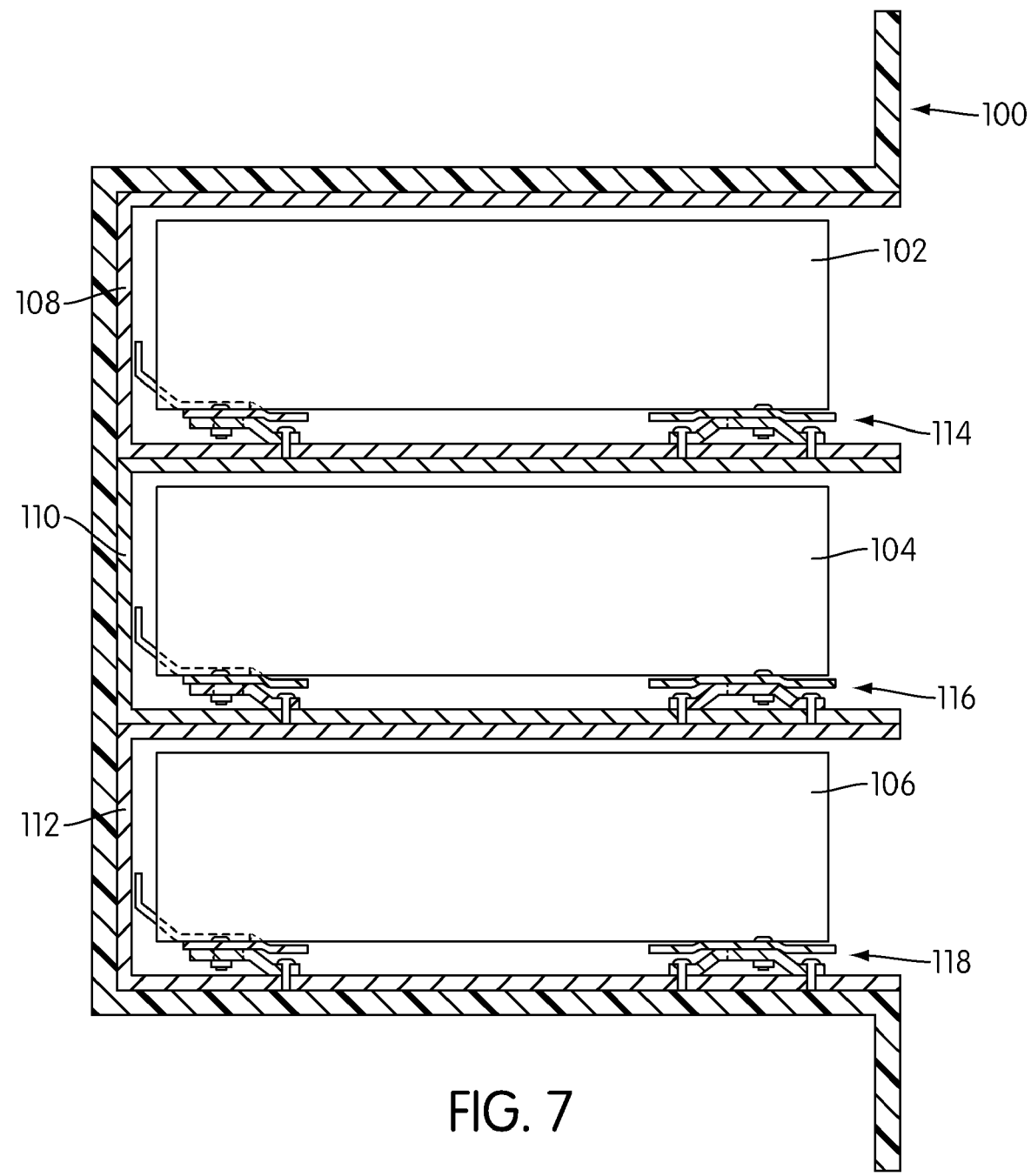
FIG. 7 is a cross-elevational sectional view of a preferred embodiment of a pre-formed opening in an instrument panel, illustrating the use of mounting systems according to another embodiment of the invention.

FIG. 7 is a side elevational sectional view of a pre-formed opening 100 in a motor vehicle instrument panel with several audio components 102, 104, 106, each mounted in its own chassis 108, 110, 112 using respective mounting systems 114, 116, 118 according to embodiments of the invention. Each of mounting systems 114, 116, 118 is similar to mounting system 10, described above. Although mounting systems 114, 116, 118 are illustrated as being substantially the same as one another and substantially the same as mounting system 10, mounting systems 114, 116, 118 may have any features deemed necessary or desirable to secure their respective audio components 102, 104, 106, and may be different from one another. For example, mounting systems 114, 116, 118 could use vibration damping elements that are the same or different with either one or two foot portions, depending on the type of audio component 102, 104, 106. However, regardless of the particular elements used in the respective mounting systems 114, 116, 118, one particular advantage of the arrangement illustrated in FIG. 7 is that each of audio components 102, 104, 106 is independently mounted, and each audio component 102, 104, 106 can be given its own level of predefined load and translate, slide, deform, or otherwise respond individually to that predefined load.

FIG. 7 also illustrates the general scheme by which a chassis 14, 108, 110, 112 is mounted within a motor vehicle. Preferably, pre-formed opening 100 is a pre-formed opening in a motor vehicle instrument panel. Pre-formed opening 100 may be formed of any conventional material, including plastics, foams and metals, and may comprise a combination of structural members and decorative paneling. The respective chassis 14, 108, 110, 112 may be mounted within pre-formed opening 100 in any known fashion.

In some embodiments, the audio component may be directly attached to the vibration damping elements, thus eliminating the need for mounting brackets. The vibration damping elements are preferably fixed to the audio component so that the audio component and vibration damping elements translate together. The vibration elements are also fastened to the chassis in such a manner as to allow translation of the vibration damping elements within chassis 14.

Figure 8:
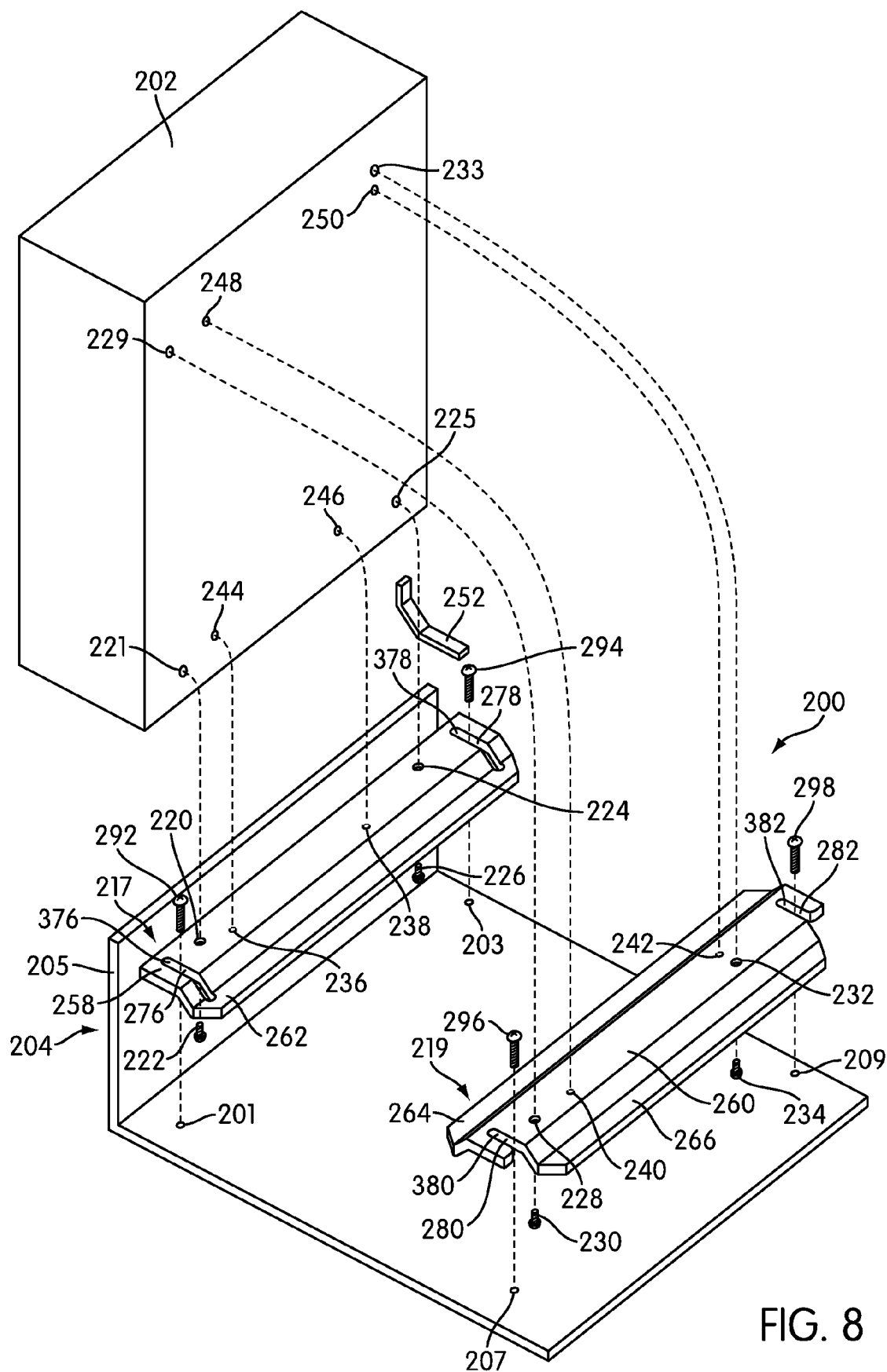
FIG. 8 is an exploded perspective view of a preferred embodiment of a mounting system.

FIG. 8 is an exploded view of a mounting system, generally indicated at 200, according to one embodiment of the invention. Mounting system 200 is particularly adapted to mount an audio component 202, which is shown in FIG. 8. As will be described in greater detail below, in one embodiment, mounting system 200 and mounted audio component 202 are preferably installed in a motor vehicle, particularly in a preformed opening in a motor vehicle instrument panel.

As used in this description, the term "audio component" refers to any audio component that may be installed in a motor vehicle, including AM, FM, and satellite radio receivers, CD players, multi-CD changers, digital audio players, and cassette tape decks. Additionally, any other piece of equipment that is capable of being installed in an instrument panel along with or alongside audio equipment may also be considered to be an audio component or audio components for purposes of this description. For example, DVD players, satellite navigation systems, and display monitors, among others, may be considered to be audio components for purposes of this description. In general, as will be explained in more detail below, the audio component mounting system of the present invention may be applied to any component that is designed to translate with respect to the instrument panel under a predefined load.

Mounting system 200 comprises, among other elements, a chassis 204. Chassis 204 is preferably made of a material such as metal, although it may be made of other materials, such as plastics. Chassis 204 is adapted to mount and retain the audio component 202. Although illustrated as having a particular structure in FIG. 8, chassis 204 may comprise any structure or set of elements that allows audio component 202 to be mounted using mounting system 200.

The sizes and relative sizes of chassis 204 and audio component 202 may vary from one embodiment to another. Generally, chassis 204 is of a standard size, and audio component 202 may have any size that fits within chassis 204. In one example, one common sizing standard for audio components is the DIN (Deutsche Industrie Norm) sizing standard, which dictates visible dimensions for each audio component of 50 mm in height by 180 mm in width. Audio components are also commonly made to a "double DIN" standard, which is conventionally taken to mean 100 mm in height by 180 mm in width. Alternatively, the sizes of chassis 204 and audio component 202 may not follow any particular standard.

In order to mount audio component 202 to chassis 204, first vibration damping element 217 and second vibration damping element 219 are fixedly mounted to the underside of audio components 202. Depending on the embodiment, first vibration damping element 217 and second vibration damping element 219 may be fixedly mounted by welding, securing with adhesives, securing with permanent fasteners, or by some other means. Although two vibration damping elements 217, 219 are shown in the view of FIG. 8, other embodiments may use any number of vibration damping elements, including vibration damping elements of various sizes and shapes.

In this embodiment, first vibration damping element 217 and second vibration damping element 219 are rail-like structures that extends transversely across the width of audio component 202. First vibration damping element 217 includes first raised land portion 258. Second vibration damping element 219 includes second raised land portion 260. First vibration damping element 217 includes first foot portion 262. Second vibration damping element 219 includes second foot portion 264 and third foot portion 266. In this aspect, first vibration damping element 217 differs from second vibration damping element 219: first vibration damping element 217 has only one foot portion 262, whereas second vibration damping element 219 has two foot portions 264, 266, one arranged on each side of land portion 260. However, in other embodiments, first vibration damping element 217 and second vibration damping element 219 may be identical.

Figure 9:
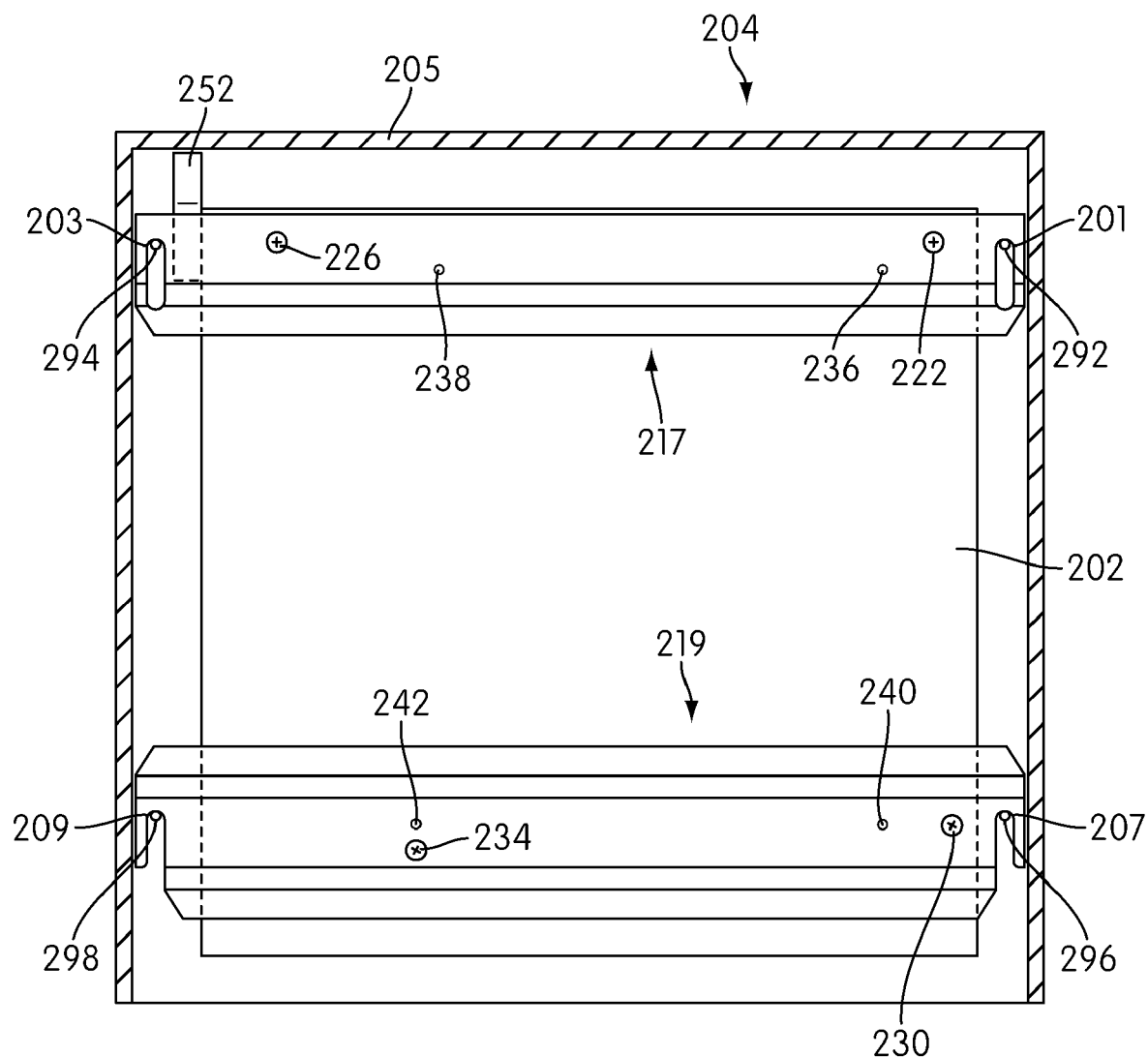
FIG. 9 is a plan view of a preferred embodiment of the underside of an audio component and a mounting system.

The construction of first vibration damping element 217 and second vibration damping element 219 can be seen in FIG. 8 and FIG. 9, which is a plan view of the underside of audio component 202. In the illustrated embodiment, the first vibration damping element 217 has first fastener hole 220 associated with first fastener 222 that engages audio component 202 at first audio fixing hole 221. Preferably, first vibration damping element 217 includes second fastener hole 224 associated with second fastener 226 that engages audio component 202 at second audio fixing hole 225. Second vibration damping element 219 has third fastener hole 228 associated with third fasteners 230 that engages audio component 202 at third audio fixing hole 229. Preferably, second vibration damping element 219 includes fourth fastener hole 232 associated with fourth fastener 234 that engages audio component 202 at fourth audio fixing hole 233. Thus, fasteners 222 are 226 are used to secure first vibration damping element 217 to audio component 202 and fasteners 230 and 234 are used to secure second vibration damping element 219 to audio component 202.

In addition to fastener holes 220, 224, 228, 232, first vibration damping element 217 and second vibration damping element 219 can optionally include at least one locating features. Specifically, first vibration damping element 217 includes two locating features 236, 238 and second vibration damping element 219 includes two locating features 240, 242. In the illustrated embodiment, the locating features 236, 238, 240, 242 are substantially hemispherical domes pressed or punched into first vibration damping elements 217 and second vibration damping element 219 that correspond with hemispherical depressions 244, 246, 248, 250 in the underside of audio component 202. Hemispherical depressions 244, 246, 248, 250 are best seen in the exploded view of FIG. 8. Locating features 236, 238, 240, 242 can assist in positioning vibration damping elements 217 and 219 with respect to audio component 202 at the time audio component 202 is attached to vibration damping elements 217 and 219. In other embodiments, locating features 236, 238, 240, 242 may be notches, slots, or any other features that aids in positioning vibration damping elements 217 and 219 with respect to audio component 202. Alternatively, locating features 236, 238, 240, 242 may be absent.

As shown in FIG. 8, first fastener 292 and second fastener 294 are inserted between land portion 258 of first vibration damping element 217 through first fastener slot 276 and second fastener slot 278. Third fastener 296 and fourth fastener 298 are inserted between second land portion 260 of second vibration damping element 219 through third fastener slot 280 and fourth fastener slot 282. Fasteners 292, 294, 296, 298 are inserted into chassis holes 201, 203, 207, 209. Fastener slots 276 and 278 preferably extend over at least a part of land portion 258 and, in the illustrated embodiment, also extend into first foot portion 262. However, in other embodiments, fastener slots 276 and 278 may be confined to land portion 258. Fastener slots 276 and 278 are preferably oriented at least generally perpendicular to the length of first vibration damping element 217, so that they extend in a generally front-to-rear direction when first vibration damping elements 217 is installed in chassis 204. However, in other embodiments, fastener slots 276 and 278 may be oriented in other directions. Fastener slots 276 and 278 of first vibration damping element 217 are preferably closed at both ends, although they may be open at one or both ends in other embodiments.

As seen in FIG. 8, second vibration damping element 219 includes second foot portion 264, and third foot portion 266, one adjacent to each side of second raised land portion 260. Second vibration damping element 219 also includes third fastener slot 280 and fourth fastener slot 282, but unlike first vibration damping element 217, fastener slots 280 and 282 of second vibration damping element 219 are open slots. That is, as shown in FIG. 8, fastener slots 280 and 282 are generally elongated with one end closed and one end open. Fastener slots 280 and 282 are preferably oriented at least generally perpendicular to the length of second vibration damping element 219, so that they extend in a generally front-to-rear direction when second vibration damping elements 219 is installed in chassis 204. However, in other embodiments, fastener slots 280 and 282 may be oriented in other directions.

First fastener 292 is inserted into first chassis hole 201. Second fastener 294 is inserted into second chassis hole 203. Third fastener 296 is inserted into third chassis hold 207. Fourth fastener 298 is inserted into fourth chassis hole 209. In this way vibration damping elements 217, 219 are mounted to chassis 204. The fasteners 292, 294, 296, 298 may be bolts, screws, rivets, or other types of fasteners.

Thus, with the above-described arrangement, audio component 202 is secured to first vibration damping element 217 and second vibration damping element 219, which are mounted on chassis 204. As will be described in more detail below, chassis 204 may be mounted within a motor vehicle.

As shown particularly in FIG. 8, vibration damping elements 217 and 219 have a generally trapezoidal shape, or, in the case of first vibration damping element 217, a partially trapezoidal shape, and they are preferably constructed of a somewhat resilient material, rather than a completely rigid or brittle material. Therefore, if chassis 204 is exposed to vibrations, as might occur if a motor vehicle travels over a bumpy road, the resiliency of vibration damping elements 217 and 219 helps to damp the vibrations and prevent them from reaching audio component 202.

Figure 10:
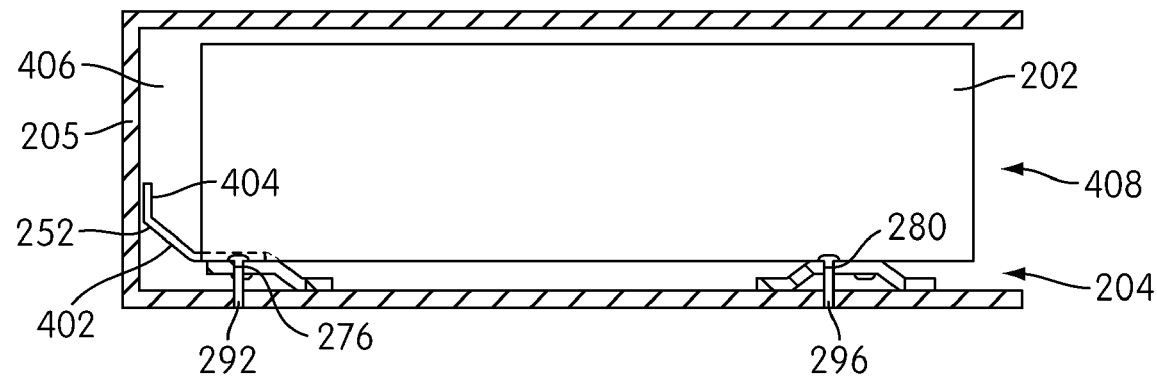
FIG. 10 is a cross-sectional view of a preferred embodiment of an audio component and a mounting system prior to impact.

Under most conditions, audio component 202 remains substantially fixed within chassis 204 because of the fastening arrangement described above. This initial position can also be observed in FIG. 10. Fasteners 292 and 296 are aligned with the first rear portion 376 of first fastener slot 276 and second rear portion 380 of third fastener slot 280 which are closest to rear wall 205. Though not seen in FIG. 10, fasteners 294 and 296 are also preferably aligned in the rear portion of fastener slots 278 and 282. In this embodiment the first portion 404 of rear tab 252 is set flush with rear wall 205. Thus, audio component 202 is set forward in chassis 204, with gap 406 between audio component 202 and rear wall 205. Preferably audio component 202 is set relatively close to predefined opening 408. In some embodiments audio component 202 is flush with predefined opening 408.

One advantage of mounting system 200 and other mounting systems according to embodiments of the invention is that under a predefined load, audio component 202 may be permitted to translate or slide within chassis 204. Using mounting system 200, it is possible for audio component 202 to translate or slide because vibration damping elements 217 and 219 are provided with fastener slots 276, 278, 280, 282.

As seen in FIG. 9, audio component 202 is preferably smaller than chassis 204 in at least one dimension, leaving room for audio component 202 to slide.

Figure 11:
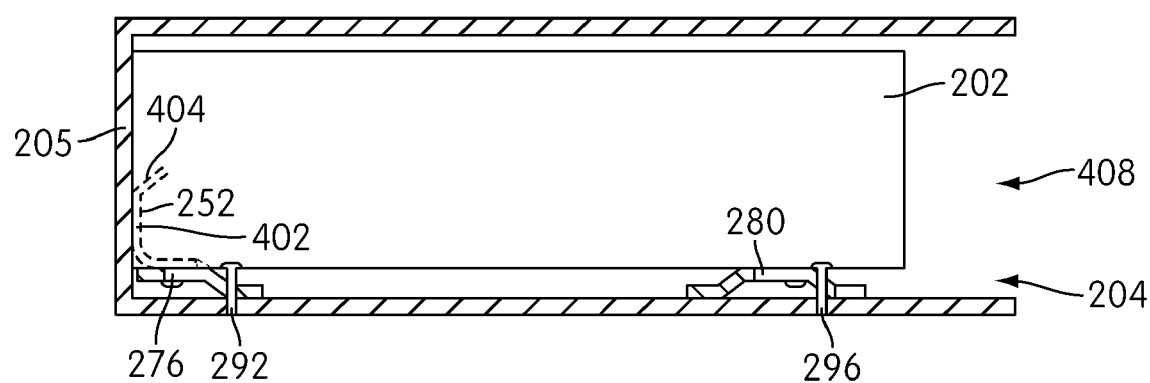
FIG. 11 is a cross-sectional view of a preferred embodiment of an audio component and a mounting system after translation under a predetermined load.

Preferably, after a predetermined load has been applied to audio component 202, audio component 202 can translate within chassis 204. FIG. 11 is a preferred embodiment of audio component 202 translated with respect to chassis 204 towards rear wall 205. First fastener 292 has been translated with respect to its initial position in first fastener slot 276. Initially first fastener 292 was located along first rear portion 376 of first fastener slot 276. Following translation under a predetermined load, first fastener 292 may be located outside of first rear portion 376 of first fastener slot 276. Third fastener 296 has been translated with respect to its initial position in third fastener slot 280. Initially third fastener 296 was located along third rear portion 380 of third fastener slot 280. Following translation under a predetermined load, second fastener 296 may be located outside of third rear portion 380 of third fastener slot 280. Second fastener 294 and fourth fastener 298 would preferably also translate with respect to second fastener slot 278 and fourth fastener slot 282.

Locating tab 252 will be bent in some embodiments of this rearward translation of audio component 202 under a predefined load. In this embodiment audio chassis 202 is in contact with rear wall 205 after translation. In other embodiments audio chassis 202 need not be in contact with rear wall 205 following translation, but audio chassis 202 will most likely be closer to rear wall 205 following translation.

The predefined load at which audio component 202 translates or slides within chassis 204 may be any level of mechanical loading. However, in preferred embodiments, the predefined load for translating or sliding is defined to be a particular level of impact or collision force exerted on audio components 202. For example, if a passenger's head were to impact audio component 202 mounted using mounting system 200 with a particular predefined load, audio component 202 would translate rearwardly in order to absorb the impact and dissipate the force. Thus, mounting system 200 is particularly advantageous for use with audio components that are more massive and stiffer and thus require special measures to meet crash impact standards. For example, mounting system 200 may be used to meet the FMVSS 201 standards in the United States ("Federal Motor Vehicle Standard 201: Occupant protection in interior impact," 37 C.F.R. § 571.201 (2004).)

It should be understood that although the terms "translate" and "slide" are used with respect to the response of mounting system 200 and audio component 202 to the predefined load, the response of mounting system 200 and audio component 202 to the predefined load may include any sort of motion, deformation, or other mechanical response that acts to dampen or dissipate the predefined load. Mounting system 200 facilitates motion and/or deformation in response to a predefined load; however, the actual response to the predefined load will depend on the magnitude of the load and the manner in which it is applied.

One other component of mounting system 200 may help to absorb impact forces. As shown in FIGS. 8 and 9 and described briefly above, locating tab 252 is connected to or integrally formed with first vibration damping element 217 of audio component 202 so as to be disposed between audio component 202 and rear wall 205 of chassis 204. During installation and mounting of audio component 202 in chassis 204, locating tab 252 helps to ensure proper placement of audio component 202. Locating tab 252 is resilient, such that if and when audio component 202 translates rearwardly, locating tab 252 will absorb at least some of the impact force.

FIG. 11 shows locating tab 252 bent away from rear wall 205, allowing audio component 202 to slide towards rear wall 205. In this embodiment middle portion 402 of rear tab 252 is in contact with rear wall 205 following translation.

However, although described as resilient, it should be understood that the degree of resiliency in locating tab 252 may vary from embodiment to embodiment. In some embodiments, locating tab 252 may keep audio component 202 in place under normal conditions and simply deform to absorb energy under the defined conditions.

Using fastener slots 276, 278, 280, 282, the amount of impact or collision force that constitutes the predefined load for translating or sliding may be determined by specifying the amount of torque applied to fasteners 292, 294, 296, 298 that secure vibration damping elements 217, 219 to chassis 204. As those of ordinary skill in the art will understand, fasteners 292, 294, 296, 298 are prevented from sliding within fastener slots 276, 278, 280, 282 by frictional forces. The amount or level of frictional force is determined by the amount of torque applied to fasteners 292, 294, 296, 298 and the coefficients of friction between fasteners 292, 294, 296, 298 and fastener slots 276, 278, 280, 282. If desired, vibration damping elements 217, 219 may be engineered to have particular coefficients of friction for more precise control over the defined condition force levels.

Fastener slots 276, 278, 280, 282 used with mounting system 200 need not be the simple elongate closed and open slots illustrated in FIGS. 8 and 9. Instead, a number of slot configurations could be used with mounting system 200, each configuration having its own advantages.

The foregoing described the application of mounting system 200 to a single audio component 202. However, mounting systems according to embodiments of the invention may also be applied to multiple audio components.

In another preferred embodiment, a single bracket element is fixed to the audio chassis, while the audio component is fastened in a manner that allows it to move independently of the single bracket and chassis in some situations.

Figure 12:
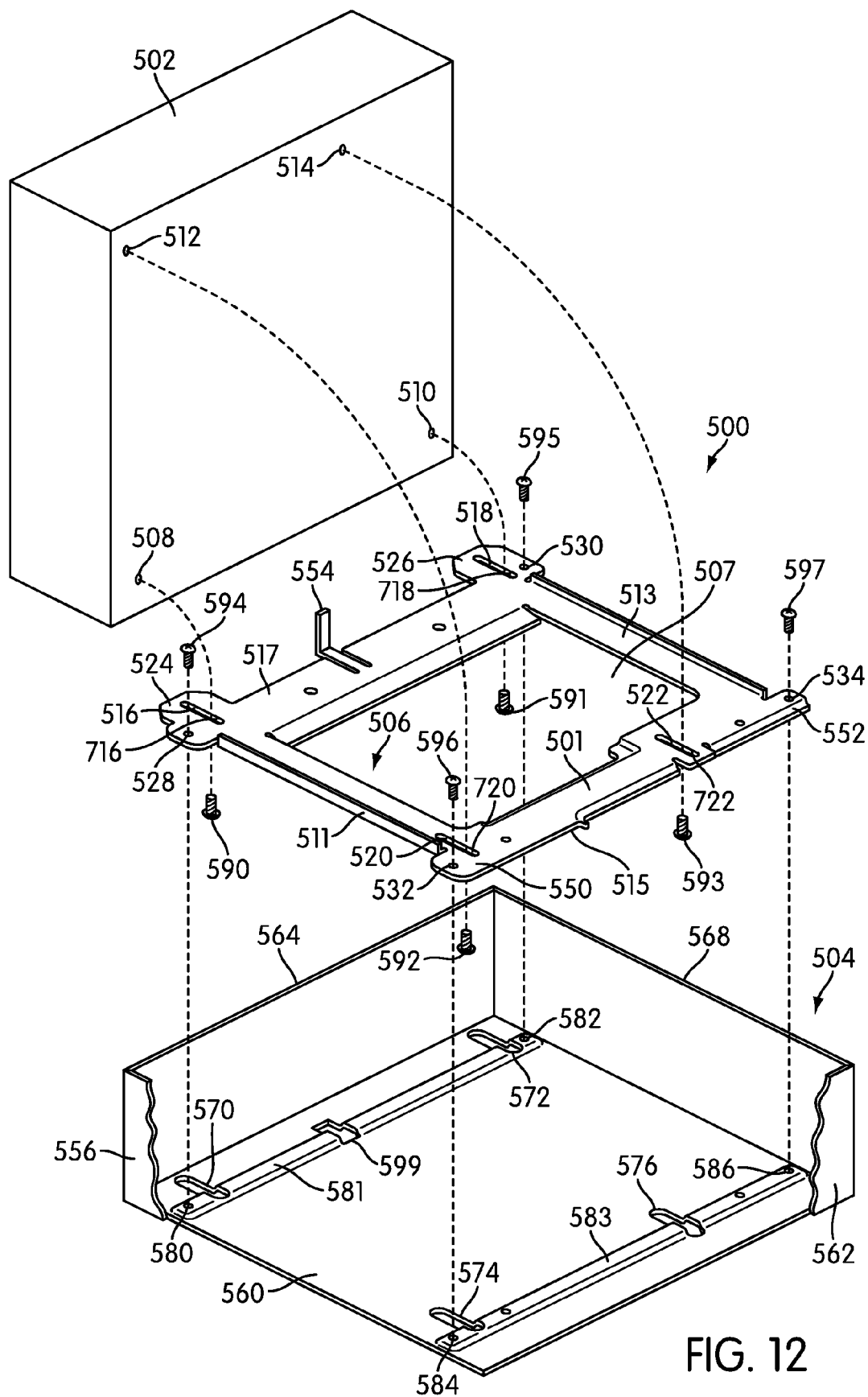
FIG. 12 is an exploded perspective view of a preferred embodiment of a mounting system.

FIG. 12 is an exploded view of a mounting system, generally indicated at 500, according to one embodiment of the invention. Mounting system 500 is particularly adapted to mount an audio component 502, which is shown in FIG. 12. As will be described in greater detail below, in one embodiment, mounting system 500 and mounted audio component 502 are preferably installed in a motor vehicle, particularly in a pre-formed opening in a motor vehicle instrument panel.

As used in this description, the term "audio component" refers to any audio component that may be installed in a motor vehicle, including AM, FM, and satellite radio receivers, CD players, multi-CD changers, digital audio players, and cassette tape decks. Additionally, any other piece of equipment that is capable of being installed in an instrument panel along with or alongside audio equipment may also be considered to be an audio component or audio components for purposes of this description. For example, DVD players, satellite navigation systems, and display monitors, among others, may be considered to be audio components for purposes of this description. In general, as will be explained in more detail below, the audio component mounting system of the present invention may be applied to any component that is designed to translate with respect to the instrument panel under a predefined load.

Mounting system 500 comprises, among other elements, a chassis 504. Chassis 504 is preferably made of a material such as metal, although it may be made of other materials, such as plastics. Chassis 504 is adapted to mount and retain the audio component 502. Although illustrated as having a particular structure in FIG. 12, chassis 504 may comprise any structure or set of elements that allows audio component 502 to be mounted using mounting system 500.

The sizes and relative sizes of chassis 504 and audio component 502 may vary from one embodiment to another. Generally, chassis 504 is of a standard size, and audio component 502 may have any size that fits within chassis 504. In one example, one common sizing standard for audio components is the DIN (Deutsche Industrie Norm) sizing standard, which dictates visible dimensions for each audio component of 50 mm in height by 180 mm in width. Audio components are also commonly made to a "double DIN" standard, which is conventionally taken to mean 100 mm in height by 180 mm in width. Alternatively, the sizes of chassis 504 and audio component 502 may not follow any particular standard.

Audio component 502 includes first audio fastener hole 508, second audio fastener hole 510, third audio fastener hole 512 and fourth audio fastener hole 514.

In order to mount audio component 502 to chassis 504, chassis bracket 506 is fixed to audio componenet 502. Depending on the embodiment, chassis bracket 506 may be fixedly mounted by welding, securing with adhesives, securing with permanent fasteners, or by some other means.

In this embodiment, chassis bracket 506 is a square like structure that fits just within chassis 504. In particular, chassis bracket 506 includes first lateral side 511, second lateral side 513, forward side 515, and rear side 517. In the center of chassis bracket 506 is bracket cutout 507. Chassis bracket 506 also includes raised bracket portion 501, which allows for vertical spacing between audio component 502 and chassis 504. Because of this arrangement, chassis bracket 506 can act like a vibration damper similar to the way the system of first vibration damping element 217 and second vibration damping element 219 operate. But in the embodiment including chassis bracket 506, the functions of the two vibration damping elements 217 and 219 are effectively combined into chassis bracket 506. In other words, chassis bracket 506 can provide the front and rear vibration damping function that is provided by first vibration damping element 217 and second vibration damping element 219 in other embodiments.

Chassis bracket 506 includes first bracket fastener slot 516, second bracket fastener slot 518, third bracket fastener slot 520 and fourth bracket fastener slot 522. First bracket fastener slot 516 is located along first mounting portion 524. Second bracket fastener slot 518 is located along second mounting portion 526. Chassis bracket 506 includes bracket fastener holes 528, 530, 532, 534. Two bracket fastener holes 528, 530, lie along bracket mounting portions 524, 526. Bracket fastener hole 532 lies along third mounting portion 550. Bracket fastener hole 534, lies along fourth mounting portion 552. Additionally, chassis bracket 506 includes rear tab 554.

A preferred embodiment of chassis 504 is shown in FIG. 12. Chassis 504 comprises floor panel 560, forward wall 562, real wall 564, first side wall 566, and second side wall 568. Chassis 504 also includes first clearance slot 570, second clearance slot 572, third clearance slot 574, and fourth clearance slot 576. Preferably these clearance slots provide clearance for the head of slot fastening elements. Additionally, chassis 504 includes tab slot 599 located adjacent to rear wall 564. Chassis 504 also includes first chassis fastener hole 580 and second chassis fastener hole 582 which are disposed along first chassis ridge 581. Chassis 504 also includes third chassis fastener hole 584 and fourth chassis fastener hole 586 which are disposed along second chassis ridge 583. First chassis ridge 581 and second chassis ridge 583 allow for minimum spacing between bracket fastener holes 528, 530, 532, 534 and chassis holes 580, 582, 584, 586.

The construction of audio mounting system 500 can be seen in FIG. 12. Audio component 502 is fastened to chassis bracket 506 with fastening slot elements 590, 591, 592, and 593. Slot fasteners 590, 591, 592, 593 are inserted through chassis bracket 506 at bracket fastener slots 516, 518, 520, 522 and attached to audio component 502 at audio component faster holes 508, 510, 512, 514.

Chassis bracket 506 is fixed in place with respect to chassis 504 with fasteners 594, 595, 596, 597. First fastener 594 is inserted into first chassis fastener hole 580. Second fastener 595 is inserted into second chassis fastener hole 582. Third fastener 596 is inserted into third chassis fastener hole 584. Fourth fastener 597 is inserted into fourth chassis fastener hole 586. Fasteners 594, 595, 596, 597 may be bolts, screws, rivets, or other types of fasteners.

Thus, with the above-described arrangement, audio component 502 is mounted on chassis bracket 506, which is fixed to chassis 504. As will be described in more detail below, chassis 504 may be mounted within a motor vehicle.

Under most conditions, audio component 502 remains substantially fixed within chassis 504 because of the fastening arrangement described above. However, one advantage of mounting system 500 and other mounting systems according to embodiments of the invention is that under a predefined load, audio component 502 may be permitted to translate or slide within chassis 504. Using mounting system 500, it is possible for audio component 502 to translate or slide because chassis bracket 506 is provided with fastener slots 516, 518, 520, 522.

Figure 13:
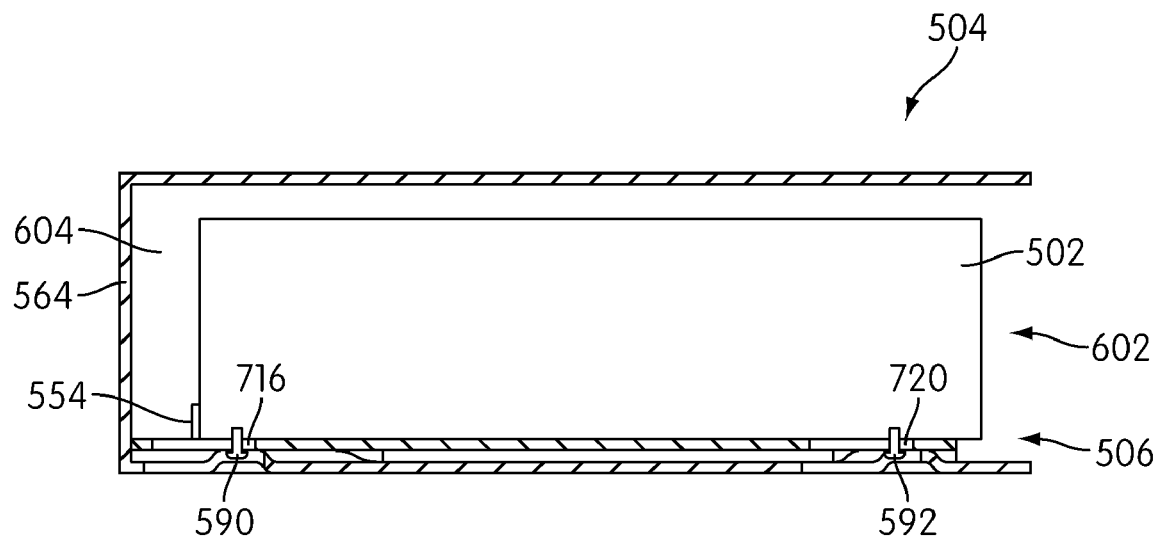
FIG. 13 is a cross-sectional view of a preferred embodiment of an audio component and a mounting system prior to impact.

FIG. 13 shows audio component 502 in its initial position with respect to chassis 504 and chassis bracket 506. As can be seen in FIG. 13, audio component 502 is preferably smaller than chassis 504 in at least one dimension, leaving room for audio component 502 to slide. In this embodiment, audio component 502 is initially disposed with respect to rear wall 564 in such a way as to leave gap 604. Preferably, audio component 502 is disposed close to preformed opening 602. This will allow for easiest access to audio component 502 by the user.

Figure 14:
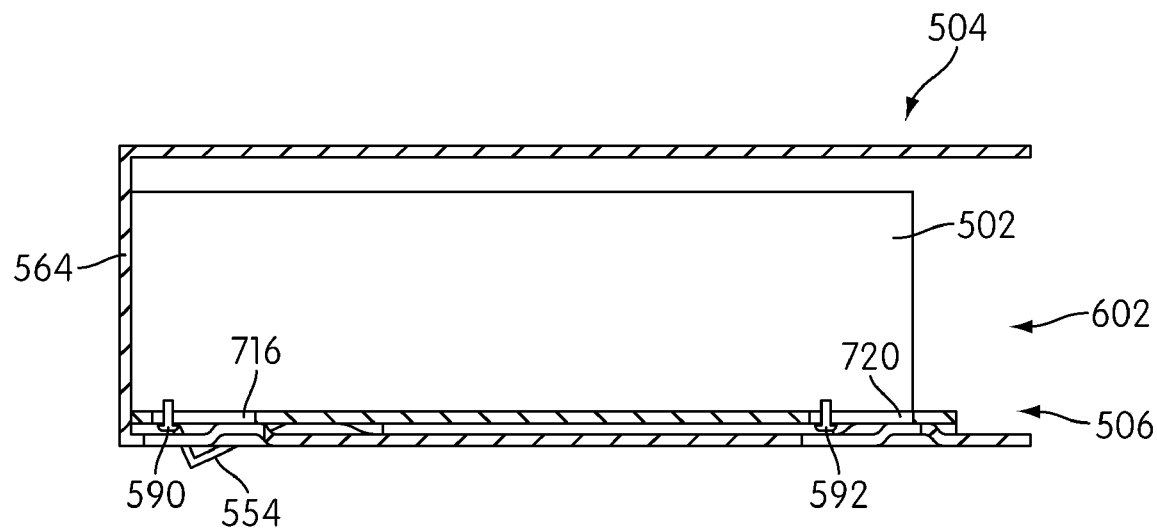
FIG. 14 is a cross-sectional view of a preferred embodiment of an audio component and a mounting system after translation under a predetermined load.

FIG. 14 is a preferred embodiment of audio component 502 translated with respect to chassis 504 towards rear wall 564. Slot fasteners 590, 592, 592, 593 have all been translated with respect to their initial positions in fastener slots 516, 518, 520, 522. Initially, as seen in FIG. 13, first slot fastener 590 was disposed along first forward portion 716 of first fastener slot 516. Third slot fastener 592 was disposed along third forward portion 720 of third fastener slot 520. After translation, slot fasteners 590 and 592 may be disposed outside of first and third forward portions 716 and 720. Additionally slot fasteners 591 and 593 may translate through fastener slots 718 and 722 in a similar manner. Slot fasteners 590, 591, 592, 593 will also be translated through clearance slots 570, 572, 574, 576. These slots allow for slot fasteners 590, 591, 592, 593 to translate with respect to chassis 504 without encountering friction with floor panel 560. Rear tab 554 may be bent in some embodiments by this rearward translation of audio component 502 under a predefined load. Rear tab 554 may partially plunge into tab slot 599 of chassis 504, as seen in FIG. 14. In other embodiments rear tab 554 may simply fold flat.

The predefined load at which audio component 502 translates or slides within chassis 504 may be any level of mechanical loading. However, in preferred embodiments, the predefined load for translating or sliding is defined to be a particular level of impact or collision force exerted on audio components 502. For example, if a passenger's head were to impact audio component 502 while mounted, using mounting system 500, with a particular predefined load, audio component 502 would translate in a rearward direction in order to absorb the impact and dissipate the force. Thus, mounting system 500 is particularly advantageous for use with audio components that are more massive and stiffer and thus require special measures to meet crash impact standards. For example, mounting system 500 may be used to meet the FMVSS 201 standards in the United States ("Federal Motor Vehicle Standard 201: Occupant protection in interior impact," 37 C.F.R. § 571.201 (2004.)

It should be understood that although the terms "translate" and "slide" are used with respect to the response of mounting system 500 and audio component 502 to the predefined load, the response of mounting system 500 and audio component 502 to the predefined load may include any sort of motion, deformation, or other mechanical response that acts to dampen or dissipate the predefined load. Mounting system 500 facilitates motion and/or deformation in response to a predefined load; however, the actual response to the predefined load will depend on the magnitude of the load and the manner in which it is applied.

One other component of mounting system 500 may help to absorb impact forces. As shown in FIG. 12 and described briefly above, rear tab 554 is connected to or integrally formed with chassis bracket 506 so as to be disposed between audio component 502 and rear wall 564 of chassis 504. During installation and mounting of audio component 502 in chassis 504, rear tab 554 helps to ensure proper placement of audio component 502. Rear tab 554 is resilient, such that if and when audio component 502 translates in a rearward direction, rear tab 554 will absorb at least some of the impact force.

However, although described as resilient, it should be understood that the degree of resiliency in rear tab 554 may vary from embodiment to embodiment. In some embodiments, rear tab 554 may keep audio component 502 in place under normal conditions and simply deform to absorb energy under the defined conditions.

Using fastener slots 516, 518, 520, 522, the amount of impact or collision force that constitutes the predefined load for translating or sliding may be determined by specifying the amount of torque applied to slot fasteners 590, 591, 592, 593 that secure audio component 502 to chassis bracket 506. As those of ordinary skill in the art will understand, slot fasteners 590, 591, 592, 593 are prevented from sliding within fastener slots 516, 518, 520, 522 by frictional forces. The amount or level of frictional force is determined by the amount of torque applied to slot fasteners 590, 591, 592, 593 and the coefficients of friction between slot fasteners 590, 591, 592, 593 and fastener slots 516, 518, 520, 522. If desired, chassis bracket 506 may be engineered to have particular coefficients of friction for more precise control over the defined condition force levels.

Fastener slots 516, 518, 520, 522 used with mounting system 502 need not be the simple elongate closed and open slots illustrated in FIG. 12. Instead, a number of slot configurations could be used with mounting system 500, each configuration having is own advantages.

The foregoing described the application of mounting system 500 to a single audio component 502. However, mounting systems according to embodiments of the invention may also be applied to multiple audio components.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A mounting system comprising:
   a chassis;
   at least one vibration damping element mounted within the chassis in a position to support and secure an audio component, the vibration damping element having a slot receiving a fastener that is connected to the audio component;
   wherein the fastener secures the audio component in a first longitudinal position;
   wherein at least one mounting bracket is connected to the audio component between the audio component and the at least one vibration damping element such that the fastener is inserted through the fastener and passes through a corresponding opening in one of the mounting brackets;
   wherein the fastener translates along the fastener slot allowing the audio component to translate longitudinally within the chassis under a predefined load, and
   wherein a torque applied to the fastener determines the level of the predefined load.

2. The mounting system according to claim 1, wherein the predefined load comprises an impact.

3. The mounting system according to claim 1, wherein the slot is a closed slot.

4. The mounting system according to claim 1, wherein the slot is an open slot.

5. The mounting system according to claim 1, wherein the slot is a keyhole slot.

6. The mounting system according to claim 1, wherein each of the vibration damping elements further comprises:
   a raised land portion; and
   at least one foot portion connected to the raised land portion and secured to the chassis; and
   wherein the slot extends through at least a part of the land portion.

7. The mounting system according to claim 6, wherein the vibration damping elements each comprise a generally trapezoidal cross-sectional shape.

8. A mounting system, comprising:
   an audio component;
   a chassis adapted to be mounted in a pre-formed opening in an instrument panel;
   at least one vibration damping element disposed between the chassis and the audio component, the vibration damping element having at least one fastener slot configured to receive at least one fastener longitudinally associating the audio component with the vibration damping element;
   at least one locating tab connected to the audio component and disposed between the audio component and the chassis in an installed position;
   wherein the fastener slot allows the audio component to translate longitudinally within the chassis under a predefined load, the predefined load being determined by a torque applied to the fastener; and
   wherein at least one mounting bracket is connected to the audio component between the audio component and the vibration damping elements such that the at least one fastener is inserted through one of the fastener slots and passes through a corresponding opening in one of the mounting brackets.

9. The mounting system according to claim 8, wherein the predefined load comprises an impact.

10. The mounting system according to claim 8, wherein the fastener slots are open slots.

11. The mounting system according to claim 8, wherein the vibration damping element further comprises:
- a raised land portion; and
- at least one foot portion connected to the raised land portion and secured to the chassis;
- wherein the fastener slot extends through at least a part of the land portion.

12. The mounting system according to claim 8, wherein the locating tab resiliently biases the audio component toward the installed position.

13. The mounting system according to claim 8, wherein the mounting bracket further comprises additional locating features.

14. A method for absorbing impact in an audio component of a motor vehicle, comprising the steps of:
- mounting the audio component onto at least one mounting bracket;
- slidably mounting the mounting bracket onto at least one vibration damper;
- mounting the vibration damper onto a chassis;
- installing the chassis into a pre-formed opening in an instrument panel of the motor vehicle;
- translating the audio component with respect to the vibration damper in response to a predetermined impact load.

15. The method according to claim 14, wherein a fastener associated with the audio component is configured to slide within a slot in the vibration damper during translation of the audio component.

16. The method according to claim 14, wherein the vibration damper is fixed to the chassis.

17. The method according to claim 14, wherein a slot on the vibration damper facilitates translation of the audio component with respect to the vibration damper.

18. The method according to claim 17, wherein a fastener associated with the audio component is configured to slide within the slot of the vibration damper during translation of the audio component.

19. A method for absorbing impact in an audio component of a motor vehicle, comprising the steps of:
- mounting the audio component onto a mounting bracket and at least one vibration damper;
- mounting the vibration damper onto a chassis;
- installing the chassis into a pre-formed opening in an instrument panel of the motor vehicle;
- inserting a fastener into a slot in the at least one vibration damper;
- applying a torque to the fastener; and
- translating the audio component with respect to the vibration damper in response to a predetermined load, wherein the torque applied to the fastener determines the predetermined load.

20. The method according to claim 19, wherein the predetermined load comprises an impact.

21. The method according to claim 19, wherein the slot on the vibration damper facilitates translation of the audio component with respect to the vibration damper.

22. The method according to claim 19, wherein the fastener is configured to slide within the slot of the vibration damper during translation of the audio component.

23. The method according to claim 19, wherein the vibration damper is fixed to the chassis.

* * * * *